United States Patent [19]

Gilbert et al.

[11] 4,062,832

[45] Dec. 13, 1977

[54] QUATERNIZED EPICHLOROHYDRIN COPOLYMER USEFUL IN TREATING POTABLE WATER AND METHOD OF PREPARATION

[75] Inventors: Herman S. Gilbert, Lake Jackson; Stephen F. Kelley, Dallas, both of Tex.

[73] Assignee: The Dow Chemical Company, Midland, Mich.

[21] Appl. No.: 663,381

[22] Filed: Mar. 3, 1976

Related U.S. Application Data

[63] Continuation-in-part of Ser. No. 543,577, Jan. 23, 1975, abandoned.

[51] Int. Cl.$^2$ .................... C08G 65/24; C08G 65/32
[52] U.S. Cl. .................... 260/47 EP; 210/54; 210/75; 260/2 A; 260/2 BP; 260/29.2 EP; 260/567.6 P
[58] Field of Search ............. 260/2 A, 29.2 EP, 2 BP, 260/47 EP, 567.6 P

[56] References Cited

U.S. PATENT DOCUMENTS

| 2,483,749 | 10/1949 | Wittcoff | 260/279 |
|---|---|---|---|
| 3,320,317 | 5/1967 | Rogers et al. | 260/567.6 |
| 3,428,680 | 2/1969 | Walker et al. | 260/567.6 |
| 3,544,655 | 12/1970 | Booth et al. | 260/830 |
| 3,625,684 | 12/1971 | Poot et al. | 96/1.5 |
| 3,640,766 | 2/1972 | Jursich et al. | 117/218 |
| 3,674,725 | 7/1972 | Aitken et al. | 260/9 |
| 3,864,288 | 2/1975 | Riew et al. | 260/2 A |

*Primary Examiner*—Harold D. Anderson
*Assistant Examiner*—E. A. Nielsen
*Attorney, Agent, or Firm*—A. Cooper Ancona

[57] ABSTRACT

This invention relates to a water soluble quaternized epihalohydrin copolymer. The copolymer is prepared by first reacting an epihalohydrin with a polyepoxide in an organic solvent in the presence of a polymerization catalyst. The copolymer thus produced is then quaternized by reacting it with a tertiary amine. The quaternized epihalohydrin copolymer is useful in removing suspended solids from aqueous dispersions. It is particularly useful in processes for clarifying raw water.

5 Claims, No Drawings

QUATERNIZED EPICHLOROHYDRIN COPOLYMER USEFUL IN TREATING POTABLE WATER AND METHOD OF PREPARATION

This application is a continuation-in-part of our copending application Ser. No. 543,577 filed Jan. 23, 1975, now abandoned.

BACKGROUND OF THE INVENTION

The use of amine and alkylene oxide polymer as flocculants and dewatering agents for sewage and in the paper industry as drainage aids and wet strength additives is well known. Not all polymers are equally good for all these purposes, however. Chlorine containing polymers, e.g., polyepichlorohydrin, have been quaternized with tertiary amines to make a variety of useful products. In U.S. Pat. No. 3,428,680 there are disclosed polyepichlorohydrins quaternized with a variety of acyclic tertiary amines having up to about 32 carbon atoms. The resulting quaternized polymers are said to be useful antibacterial agents.

Other similar quaternized polymers are described in U.S. Pat. No. 3,591,520 and are said to be useful in conjunction with metal salts for breaking oil-in-water emulsions. Still other uses are indicated in U.S. Pat. No. 3,674,725 where similar quaternized epichlorohydrin polymers are used as retention aids for starch on cellulosic fibers. Polyepichlorohydrins quaternized with lower tertiary alkyl amines are disclosed in U.S. Pat. No. 3,320,317 wherein the products are utilized in the treatment of raw sewage. The copolymerization of various polyepoxides with epichlorohydrin or mixtures thereof with other monoepoxides e.g., propylene oxide to produce elastomers is disclosed in U.S. Pat. No. 3,544,655.

SUMMARY OF THE INVENTION

It has now been discovered that a novel water-soluble quaternized halogen-containing alkylene oxide copolymer crosslinked with a polyepoxide is unexpectedly effective in removing suspended solids from aqueous dispersions. The copolymer is particularly effective in clarifying raw water. The copolymer is preferably characterized by having mer units in the proportion of 50 to 99.9 mole percent from an epihalohydrin, 0 to 49.9 mole percent from a non-halogen-containing alkylene oxide and 0.1 to 10 mole percent, preferably 0.7 to 7 mole percent, from a polyepoxide. From 10 to 100 percent of the halogen atoms of the copolymer have been quaternized with a tertiary amine. The copolymer has an average molecular weight in the range from 2,000 to 150,000. The copolymer is usually employed at a level from 0.05 to 10 parts per million (ppm) based upon the weight of the aqueous dispersion.

DETAILED DESCRIPTION OF THE INVENTION

In a general method of preparation of the quaternized copolymer, a Lewis acid catalyst such as, for example, fluoboric acid or boron trifluoride etherate is dispersed in a solvent for the copolymerization reaction. Suitable solvents which are inert to the reactants and the conditions of the reaction are benzene and toluene, preferably chlorinated solvents such as methylene chloride or ethylene dichloride. A mixture of the alkylene oxide and polyepoxide reactants is added to the solvent and catalyst. The polymerization reaction is conducted at a temperature from 40° to 50° C at atmospheric pressure in the absence of oxygen for ½ to 1 hour. The reaction mixture is further digested for ½ to 1 hour, after which the solvent is removed under vacuum. The resulting copolymer is then reacted with an aqueous solution of a tertiary amine to quaternize the pendant chlorine atoms. The quaternization reaction is run at 80° to 100° C under autogenous pressure for a period of 12 to 16 hours. Unreacted tertiary amine is then removed and the solids content of the aqueous solution is adjusted to the desired level, usually 50% solids.

Alternatively the alkylene oxide monomers are reacted in a known manner to produce a polyepihalohydrin polymer or copolymer with non-halogen-containing alkylene oxides. The polyepihalohydrin polymer is then reacted with a polyepoxide. The resulting copolymer is then quaternized as described above.

Suitable halogenated alkylene oxide monomers are those having the formula

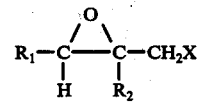

where $R_1$ and $R_2$ are independently hydrogen, lower alkyl and halo alkyl and X is a halogen atom, preferably chlorine. Examples of specific monomers are epichlorohydrin 2-methyl epichlorohydrin and 1,4-dichloro-2,3-epoxy-butane. The preferred halogenated alkylene oxide monomer is epichlorohydrin. Mixtures of epichlorohydrin with 2-methyl epichlorohydrin or 1,4-dichloro-2,3-epoxybutane are also useful.

Suitable non-halogen-containing alkylene oxides are the lower alkylene oxides such as, for example, ethylene oxide, propylene oxide and butylene oxide; and aryl oxides such as, for example, styrene oxide; alkyl glycidyl ethers such as, for example, butyl glycidyl ether, allyl glycidyl ether, and allyloxy propyl glycidyl ether; and aryl glycidyl ethers such as, for example, phenyl glycidyl ether and phenyloxypropyl glycidyl ether.

Suitable polyepoxides are any alkyl, cycloalkyl, alkaryl, dialkyl ether or diaryl ether compound that contains at least two epoxide groups. Examples of suitable polyepoxides include vinylcyclohexane depoxide; 3,4-epoxycyclohexylmethyl-3,4-epoxycyclohexane carboxylate; bis(2,3-epoxycyclopentyl)ether, dicyclopentadiene diepoxide, resorcinol diglycidyl ether, glycerine diglycidyl ether, polyglycidyl ethers formed by reacting an epihalohydrin with a polyhydric polyglycol in the presence of an alkali catalyst, diglycidyl ethers of bisphenols and bisphenol-epihalohydrin adducts which have the formula

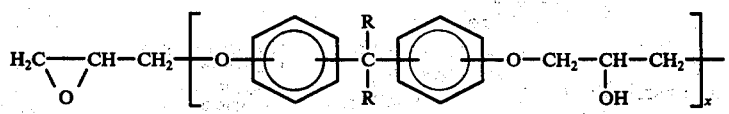

-continued

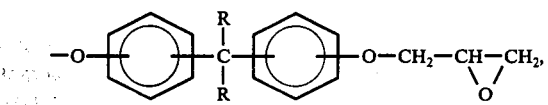

wherein X ranges from 0 to 20 and R is an alkyl group containing from one to six carbon atoms, and compounds containing multiple epoxide groups such as epoxylated novolac resins having the formula

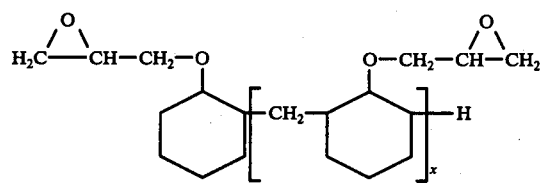

wherein x has an average value ranging from 1.02 to 7. A preferred polyepoxide is the diglycidyl ether of bisphenol A [2,2-di(4-hydroxyphenyl)propane].

Suitable tertiary amines are the lower alkyl tertiary amines, those amine containing alkyl groups having from one to three carbon atoms. Examples include tri-n-propylamine, N,N-diethyl-N-methylamine, N-ethyl-N-methyl-N-n-propylamine. Preferred are trimethylamine ro triethylamine.

EXAMPLE 1 a. Halogen-containing copolymer was prepared by charging a 2 liter pot with 600 g of methylene chloride and 3 g of a 50 percent aqueous solution of fluoboric acid. The dispersion was purged with nitrogen gas and the temperature of the dispersion was raised to 40° C while stirring. A mixture of 30 g (0.088 g-mole) of the diglycidyl ether of bisphenol A dissolved in 270 g (2.919 g-mole) of epichlorohydrin was fed to the reaction vessel at a rate which maintained the temperature between 40° to 50° C over a period of about 45 minutes. The polymerization was carried out at atmospheric pressure in a nitrogen gas atmosphere. The reaction product was digested for 1 hour at 50° C and the solvent removed under vacuum. The molecular weight of the product was 27,000.

b. One hundred grams (100 g) of the halogen-containing copolymer described above and 293 ml of a 25% aqueous solution of trimethylamine were fed into 1910-ml autoclave. The autoclave was closed, then rocked and heated for 10 hours at a temperature between 95° and 100° C. Excess water and trimethylamine were removed and the solids content adjusted to 50 percent solids. The extent of the quaternization, determined by titration of ionic chloride with 0.1N AgNO₃, was 99 percent.

EXAMPLE 2 a. A mixture of 150 g of methylene chloride, 88.5 g (0.957 g-mole based upon the monomer) of a previous prepared polyepichlorohydrin having a molecular weight of 1430, and 11.5 g (0.034 g-mole) of the diglycidyl ether bisphenol A were placed in a 500 ml pot. The catalyst was the residual fluoboric acid remaining in the polyepichlorohydrin from the original polymerization. The reaction was carried out at a temperature of 41° C over a period of 1 hour. After the reaction, the solvent was removed under vacuum. The molecular weight of the resulting copolymer was 93,120.

b. The resulting copolymer was quaternized with methylamine as described in Example 1(b).

EXAMPLE 3 a. A large scale preparation of the halogen-containing copolymer was conducted by first charging a reactor with 224 kg of methylene chloride and 1.1 kg. of a 50% aqueous solution of fluoboric acid. Then a solution of 102 kg (1.103 kg-mole) of epichlorohydrin and 10 kg (0.029 kg-mole) of diglycidyl ether of bisphenol A was added to the reactor over a period of 2.75 hours while the temperature of the reaction mixture was maintained at about 45° C. The reaction mixture was then digested for 1 hour at a temperature between 40 ° and 50° C at a pressure between 1.05 and 2.81 kg/cm², after which time the solvent was removed under vacuum.

b. Example 3(a) was repeated four times. A composite copolymer batch from the four preparations of 484 kg was placed in a large reactor with 298 kg of trimethylamine in 873 kg of water. The temperature of the mixture was raised to between 90° and 95° C and maintained at that range for 14 hours at a pressure of up to 6.33 kg/cm². As the trimethylamine reacts the pressure dropped to between 0.70 and 1.05 kg/cm². At the conclusion of the quaternization reaction excess trimethylamine and water, 17 and 129 kg respectively, were removed by distillation leaving 1529 kg of a solution containing 50 percent solids of the quaternized copolymer.

EXAMPLES 4 THROUGH 7 AND COMPARATIVE RUN A

Epichlorohydrin-diglycidyl ether of bisphenol A copolymers were prepared in a method similar to that of Example 1(a). The copolymers contained 0.69, 1.41, 2.93, and 4.56 mole percent diglycidyl ether of bisphenol A. Each copolymer was 95% quaternized with trimethylamine. A homopolymer of epichlorohydrin having 95% of the chlorine atoms quaternized with trimethylamine was used for comparison purposes. The polymers of the invention and the comparative polymer were tested for their efficiency in reducing the turbidity of raw water. Raw water samples were put in 1 liter beakers. One of the quaternized polymers was added to each sample at a dosage of 2 parts per million. Each solution was stirred for 1 minute at 100 rpm, then stirred for 15 minutes at 30 rpm, and finally let stand for 5 minutes. The turbidity of the raw water was measured before adding the polymer and again after stirring. The following table shows the percent diepoxide, the molecular weight of the polymer before quaternization and the percent reduction of turbidity.

|  | Mole % Diepoxide | Mol. Wt. | % Reduction of Turbidity |
| --- | --- | --- | --- |
| Comparative Run A | 0 | 2,000 | 45 |
| Example 4 | 0.69 | 3,300 | 55 |
| Example 5 | 1.41 | 6,600 | 62 |
| Example 6 | 2.93 | 26,600 | 65 |

-continued

|  | Mole % Diepoxide | Mol. Wt. | % Reduction of Turbidity |
|---|---|---|---|
| Example 7 | 4.56 | >50,000 | 58 |

EXAMPLE 8

The copolymer from Example 6 was employed to clarify raw water from the Mississippi River. Using a beaker test described in Examples 4 through 7 with the copolymer dosage at 2 parts per million, the turbidity was reduced from 120 Jackson turbidity Units (JTU) to 4.5 JTU. Using a commercial 10,000 gallon-per-minute clarifier with the polymer dosage at 0.75 parts per million, the turbidity was reduced from 120 JTU to between 1 and 2 JTU.

EXAMPLE 9 AND COMPARATIVE RUN B

Raw water from the Brazos River having a turbidity of between 27 and 30 parts per million was clarified using 9,000 gallon-per-minute Infilco Upflow Clarifiers. Treatments using the copolymer from Example 6 were compared with a standard treatment using lime, ferrous sulfate, and chlorine. Using the copolymer at 0.5 ppm parts per million produced treated water with a turbidity of 0.5 ppm. The standard treatment produced water with a turbidity of 2.0 ppm.

EXAMPLE 10

The copolymer from Example 6 was employed to clarify raw water from Lake Michigan. Using a beaker test as described in Examples 4 through 7 and employing a dosage of 0.2 ppm of copolymer, the turbidity was reduced from 0.8 ppm to 0.15 ppm.

EXAMPLE 11

Raw water from the Colorado River in Arizona was clarified by passing the water through a filter bed treated with the copolymer of the invention. The filter bed was prepared in the following manner: A filter aid slurry was prepared by mixing 4.5 kg of diatomaceous earth and 1 kg of the copolymers of Example 6 in water. The slurry was then passed through a wire mesh filter screen leaving the surface of the screen coated with the treated filter aid. The filter cake covered the entire surface of the screen, an area of 6.5 square meters, with a thickness of 3.2 millimeters. The water to be clarified had a pH of 8.0 and contained from 0.2 to 0.4 ppm chlorine. The level of suspended matter in the water after clarification was determined by measuring plugging factor according to the following procedure.

1. 500 ml of clarified water is passed through a microporous membrane filter having a pore diameter of 0.45 micron. The time ($T_1$) for the water to pass through the filter is measured.
2. More of the same water is passed through the filter at a given flow rate for 15 minutes.
3. An additional 500 ml of water is passed through the filter and the time ($T_2$) for the water to pass through is measured.

The plugging factor is expressed as a percent and is calculated by the formula $$\text{plugging factor (\%)} = \frac{T_1 - T_2}{T_2} \times 100$$

Four runs were made testing the effectiveness of adding diatomaceous earth and the copolymer from Example 6 continuously to the water before clarification. The results are as follows:

| Run | Diatomaceous earth, ppm. | Copolymer, ppm. | Plugging factor, % | Turbidity, JTU |
|---|---|---|---|---|
| 1 | 0 | 0 | 91% (5 minutes) | 2.0 |
| 2 | 15 | 0 | 58 | 0.25 |
| 3 | 15 | 1 | 22 | 0.18 |
| 4 | 15 | 2 | 17 | 0.16 |

We claim:
1. A water-soluble, crosslinked, quaternized halogen-containing alkylene oxide copolymer consisting essentially of mer units derived from (1) an epihalohydrin in the proportion of 50 to 99.9 mole percent, (2) a non-halogen-containing alkylene oxide in the proportion of 0 to 49.9 mole percent and (3) a polyepoxide in the proportion of from 0.1 to 10 mole percent, wherein from 10 to 100 percent of the halomethyl groups of the copolymer have been quaternized by reaction with a tertiary amine.
2. The copolymer of claim 1 wherein the proportion of mer units of the polyepoxide is from 0.7 to 7 mole percent.
3. The copolymer of claim 2 wherein the average molecular weight is within the range of 2000 to 150,000.
4. The copolymer of claim 3 wherein the mer units are derived from epichlorohydrin and the diglycidyl ether of bisphenol A.
5. The copolymer of claim 4 wherein the tertiary amine is trimethylamine.

* * * * *